US011392367B2

(12) United States Patent
Tsuji

(10) Patent No.: US 11,392,367 B2
(45) Date of Patent: Jul. 19, 2022

(54) AIR-CONDITIONING SYSTEM AND PROGRAM UPDATE METHOD OF AIR-CONDITIONING SYSTEM

(71) Applicant: Mitsubishi Electric Corporation, Tokyo (JP)

(72) Inventor: Takayuki Tsuji, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/257,060

(22) PCT Filed: Sep. 10, 2018

(86) PCT No.: PCT/JP2018/033426
§ 371 (c)(1),
(2) Date: Dec. 30, 2020

(87) PCT Pub. No.: WO2020/053928
PCT Pub. Date: Mar. 19, 2020

(65) Prior Publication Data
US 2021/0182050 A1 Jun. 17, 2021

(51) Int. Cl.
*G06F 8/65* (2018.01)
*F24F 11/30* (2018.01)
(Continued)

(52) U.S. Cl.
CPC ............. *G06F 8/65* (2013.01); *F24F 11/30* (2018.01); *G05B 15/02* (2013.01); *G05B 2219/2614* (2013.01); *G06F 9/44* (2013.01)

(58) Field of Classification Search
None
See application file for complete search history.

(56) References Cited

U.S. PATENT DOCUMENTS 9,021,460 B2 * 4/2015 Yoshida ............... G06F 8/65
717/171
2005/0251677 A1 * 11/2005 Maeda ............. H04L 63/0428
713/165
(Continued)

FOREIGN PATENT DOCUMENTS

EP 1688834 A2 * 8/2006 ............... G06F 8/60
JP 2004-294028 A 10/2004
(Continued)

OTHER PUBLICATIONS

Extended European Search Report dated Aug. 13, 2021 issued in corresponding European patent application No. 18933356.0.
(Continued)

*Primary Examiner* — Philip Wang
(74) *Attorney, Agent, or Firm* — Posz Law Group, PLC

(57) ABSTRACT

An air-conditioning system includes one or more pieces of equipment involved in air-conditioning, and a controller connected to the equipment and configured to update a control program of the equipment, the controller including an input unit configured to receive an update program for updating the control program of the equipment from an outside, a storage unit configured to store the control program of the equipment, a comparison unit configured to compare the update program with the control program, a data generation unit configured to generate differential data between the update program and the control program, an update setting unit configured to set an update target device of the control program among the one or more pieces of the equipment based on a comparison result, and a transmission unit configured to transmit the differential data to the update target device.

14 Claims, 4 Drawing Sheets

(51) Int. Cl.
*G05B 15/02* (2006.01)
*G06F 9/44* (2018.01)

(56) References Cited

U.S. PATENT DOCUMENTS

| | | |
|---|---|---|
| 2012/0204167 A1 | 8/2012 | Yoshida |
| 2012/0209977 A1* | 8/2012 | Nakajo .............. G06K 15/1803 709/223 |
| 2013/0145141 A1 | 6/2013 | Han et al. |
| 2014/0047430 A1* | 2/2014 | Kanematsu ........ H04N 1/00973 717/170 |
| 2015/0308707 A1* | 10/2015 | Tanaka ..................... F24F 11/30 700/276 |
| 2016/0025370 A1* | 1/2016 | Sugimura ............... G06F 8/656 165/200 |
| 2017/0017482 A1* | 1/2017 | Yabe ......................... G06F 8/65 |
| 2017/0038086 A1* | 2/2017 | Nabeshima ....... H04M 1/72415 |
| 2019/0220268 A1* | 7/2019 | Suzuki .................... H04L 63/02 |
| 2019/0230771 A1* | 7/2019 | Hoshi ..................... H04W 8/22 |
| 2019/0258470 A1* | 8/2019 | Miyake ................... G06F 3/067 |
| 2020/0018510 A1* | 1/2020 | Iguchi ..................... F24F 11/88 |
| 2021/0044957 A1* | 2/2021 | Norp ....................... H04W 8/18 |
| 2021/0173634 A1* | 6/2021 | Nakahara .............. G06F 3/0673 |

FOREIGN PATENT DOCUMENTS

| | | |
|---|---|---|
| JP | 2005-195303 A | 7/2005 |
| JP | 2006-031455 A | 2/2006 |
| JP | 2007-079764 A | 3/2007 |
| JP | 2012-043118 A | 3/2012 |
| JP | 2012163994 A | 8/2012 |
| WO | 2015/037108 A1 | 3/2015 |
| WO | 2016/016991 A1 | 2/2016 |
| WO | 2018/020584 A1 | 2/2018 |

OTHER PUBLICATIONS

Hidetoshi Teraoka et al. Incremental Update Method for Vehicle Microcontrollers, 2017 IEEE 6th Global Conference on Consumer Electronics (GCCE), Oct. 24, 2017, Japan.
International Search Report of the International Searching Authority dated Oct. 16, 2018 for the corresponding international application No. PCT/JP2018/033426 (and English translation).
Office Action dated Oct. 26, 2021 issued in corresponding Japanese patent application No. 2020-546552 (and English machine translation).
Office Action dated Apr. 8, 2022 issued in corresponding European patent application No. 18933356.0.
Office Action dated Apr. 12, 2022 issued in corresponding Japanese patent application No. 2020-546552.

* cited by examiner

FIG. 3
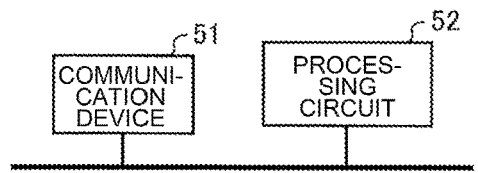
FIG. 4
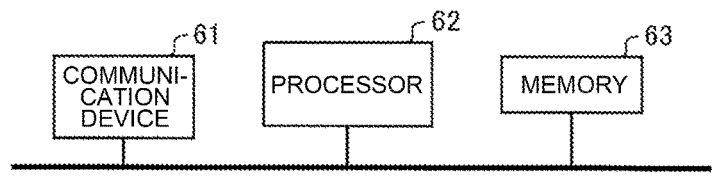
FIG. 5
| CONTROL PROGRAM X<br>PROGRAM ID : xx<br>ATTRIBUTE :<br>OUTDOOR UNIT | BASE PROGRAM |
| --- | --- |
| | DIFFERENTIAL DATA A (Ver. 1.01) |
| | DIFFERENTIAL DATA B (Ver. 1.02) |
| | DIFFERENTIAL DATA C (Ver. 1.10) |
| ⋮ | ⋮ |
| CONTROL PROGRAM Y<br>PROGRAM ID : yy<br>ATTRIBUTE :<br>INDOOR UNIT | BASE PROGRAM |
| | DIFFERENTIAL DATA D (Ver. 1.01) |
| | DIFFERENTIAL DATA E (Ver. 1.02) |
| | DIFFERENTIAL DATA F (Ver. 1.03) |

AIR-CONDITIONING SYSTEM AND PROGRAM UPDATE METHOD OF AIR-CONDITIONING SYSTEM

CROSS REFERENCE TO RELATED APPLICATION

This application is a U.S. national stage application of PCT/JP2018/033426 filed on Sep. 10, 2018, the contents of which are incorporated herein by reference.

TECHNICAL FIELD

The present disclosure relates to an air-conditioning system that updates a control program of equipment involved in air-conditioning, and a program update method of the air-conditioning system.

BACKGROUND ART

A large number of units such as outdoor units, indoor units, branch controllers, ventilating devices, and remote controls are connected to an air-conditioning system, and the respective units are installed in various locations. In addition, dozens or hundreds of units are connected to a large scale air-conditioning system.

For the above-described air-conditioning system, when maintenance such as update of a control program is performed on each of the units, an operator has directly accessed each of the units and performed the maintenance. For this reason, it takes a considerably long period of time to perform the maintenance on all of the units, and burden of the operator is substantial. In particular, since an indoor unit is typically installed in a location such as a space above a ceiling where it is difficult for the operator to access, when the control program is to be updated, it is very difficult for the operator to open a panel of the indoor unit installed in the space above the ceiling, and access a control substrate.

In view of the above, various methods have been recently proposed to alleviate the burden of the operator and also shorten the time to perform the maintenance. For example, Patent Literature 1 discloses a controller of an air-conditioning apparatus, the controller communicating with respective units disposed in the air-conditioning apparatus to update control programs of the respective units. In this air-conditioning apparatus, to reduce data capacities of the respective units, control programs for the update are stored in the controller, and communications are performed between the controller and the units to update the control programs of the units.

In addition, Patent Literature 2 discloses an air-conditioning system that automatically updates control programs of a plurality of air-conditioning controllers by communications. In this air-conditioning system, to reduce a communication traffic, the control programs are only updated when the control programs are of the same type as before and are also to be updated to a new version, instead of automatic update of the control programs of all of the air-conditioning controllers. Furthermore, Patent Literature 3 discloses an air-conditioning device that resets control parameters when a write instruction command is input from an outside.

CITATION LIST

Patent Literature

Patent Literature 1: Japanese Unexamined Patent Application Publication No. 2004-294028

Patent Literature 2: Japanese Unexamined Patent Application Publication No. 2007-079764

Patent Literature 3: Japanese Unexamined Patent Application Publication No. 2005-195303

SUMMARY OF INVENTION

Technical Problem

However, according to the methods described in Patent Literatures 1 and 2, when the control programs are updated, it is based on the premise that all data in the control programs is to be updated. For this reason, there is room for improvement in terms of a communication data amount used to perform the update.

In addition, according to the method described in Patent Literature 3, when a large number of units are connected to the air-conditioning system, it is difficult to determine which unit is an update target. For this reason, it is very difficult for the operator to update the control program on site.

The present disclosure has been made in view of the above-described problems, and is aimed at providing an air-conditioning system that can reduce a communication data amount, and can also easily update a control program, and a program update method of the air-conditioning system.

Solution to Problem

An air-conditioning system according to one embodiment of the present disclosure is an air-conditioning system including one or more pieces of equipment involved in air-conditioning, and a controller connected to the one or more pieces of equipment and configured to update a control program of the one or more pieces of equipment, the controller including an input unit configured to receive an update program for updating the control program of the one or more pieces of equipment from an outside, a storage unit configured to store the control program of the one or more pieces of equipment, a comparison unit configured to compare the update program with the control program, a data generation unit configured to generate differential data between the update program and the control program, an update setting unit configured to set an update target device corresponding to an update target of the control program among the one or more pieces of equipment based on a comparison result of the comparison unit, and a transmission unit configured to transmit the differential data to the update target device.

In addition, a program update method of an air-conditioning system according to one embodiment of the present disclosure is a program update method of an air-conditioning system for updating a control program of one or more pieces of equipment involved in air-conditioning, the program update method including a step of receiving an update program for updating the control program of the one or more pieces of equipment from an outside, a step of comparing the update program with the control program of the one or more pieces of equipment, a step of generating differential data between the update program and the control program, a step of setting an update target device corresponding to an update target of the control program among the one or more pieces of equipment based on a result of the comparing, and a step of transmitting the differential data to the update target device that is set.

Advantageous Effects of Invention

According to the embodiments of the present disclosure, based on the comparison result between the update program and the control program of the one or more pieces of equipment, the differential data between the two programs is generated and transmitted to the update target device. With this configuration, the communication data amount between the controller and the update target device can be reduced, and also the control program can be easily updated.

BRIEF DESCRIPTION OF DRAWINGS

FIG. 3 is a hardware configuration diagram illustrating an example of a configuration of a control unit of FIG. 2.

FIG. 4 is a hardware configuration diagram illustrating another example of the configuration of the control unit of FIG. 2.

FIG. 5 is a schematic diagram illustrating an example of a structure of a control program stored in a storage unit of FIG. 2.

DESCRIPTION OF EMBODIMENT

Embodiment 1

Hereinafter, an air-conditioning system according to Embodiment 1 of the present disclosure will be described. The air-conditioning system according to Embodiment 1 is configured to update a control program of one or more pieces of equipment involved in air-conditioning.
[Configuration of Air-Conditioning System 100]

Figure 1:
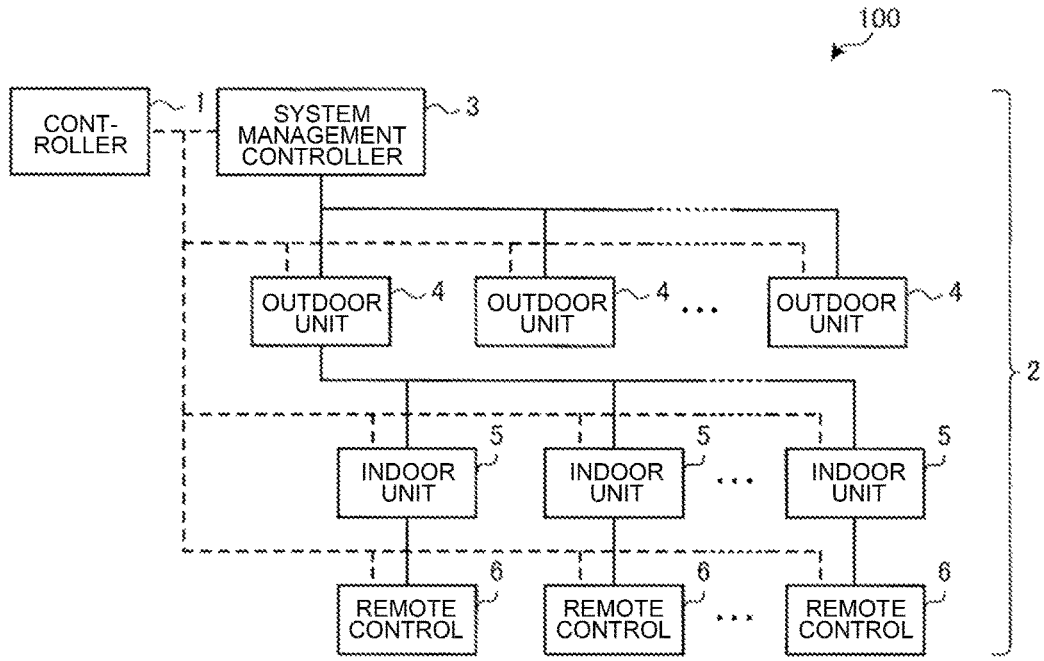
FIG. 1 is a block diagram illustrating an example of a configuration of an air-conditioning system according to Embodiment 1.

FIG. 1 is a block diagram illustrating an example of a configuration of an air-conditioning system 100 according to Embodiment 1. As illustrated in FIG. 1, the air-conditioning system 100 is configured by controllers 1 and one or more pieces of equipment 2. In this example, the one or more pieces of equipment 2 are configured by a system management controller 3, outdoor units 4, 4, . . . , indoor units 5, 5, . . . , and remote controls 6, 6, . . . . It is noted that the one or more pieces of equipment 2 are not limited to this example, and may also include, for example, equipment involved in air-conditioning such as branch controllers and ventilating devices. In addition, the numbers of the respective pieces of equipment 2 are not limited to this example, and any number of devices may also be used.

The controller 1 is connected to each of the system management controller 3, the outdoor units 4, 4, . . . , the indoor units 5, 5, . . . , and the remote controls 6, 6, . . . by communication lines that are wired or wireless as represented by dotted lines of FIG. 1. The controller 1 is disposed to control update of a control program in each of the one or more pieces of equipment 2, and when the control program is updated, the controller 1 transmits data needed for the update to the equipment 2 of an update target (hereinafter, appropriately referred to as an "update target device").

The system management controller 3 is connected to the outdoor units 4, 4, . . . by the communication lines, and transmits and receives various data to and from the outdoor units 4, 4, . . . to manage and control the outdoor unit 4 and the indoor units 5, 5, . . . that are connected to the outdoor unit 4. For example, the system management controller 3 receives information indicating statuses of the outdoor unit 4 and the indoor unit 5, and also transmits controls signals for controlling these units via the communication lines.

The outdoor unit 4 is connected to the indoor units 5, 5, . . . by the communication lines, and performs an air-conditioning operation in cooperation with the indoor units 5, 5, . . . based on the control signals received from the system management controller 3.

In addition, upon operation, the outdoor unit 4 transmits a signal including data needed for the system management controller 3 to perform the control to the system management controller 3 via the communication line.

The indoor unit 5 is installed in an air-conditioned space, and conditions air in the air-conditioned space based on the control from the outdoor unit 4. For example, respective units in the indoor unit 5 are controlled based on the control signals from the outdoor unit 4, and the indoor unit 5 performs various operations such as a cooling operation and a heating operation.

The remote control 6 is disposed to operate the air-conditioning system 100 and configured to transmit operation signals according to operations by a user to the outdoor unit 4 and the indoor unit 5 via the communication lines. For example, the user operates the remote control 6 to set a room temperature at the time of the cooling operation or the heating operation for the air-conditioned space.
(Controller 1)

Figure 2:
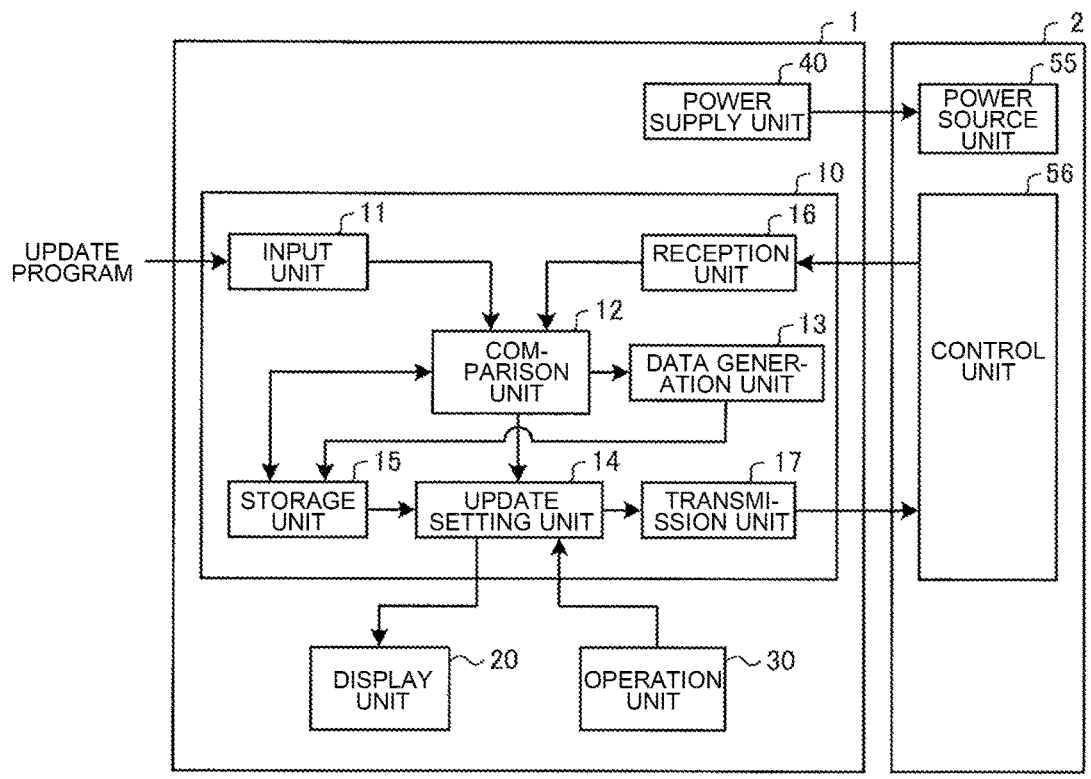
FIG. 2 is a functional block diagram illustrating an example of a configuration of a controller of FIG. 1.

FIG. 2 is a functional block diagram illustrating an example of a configuration of the controller 1 of FIG. 1. As illustrated in FIG. 2, the controller 1 includes a control unit 10, a display unit 20, an operation unit 30, and a power supply unit 40.

The control unit 10 updates the control program of the equipment 2 disposed in the air-conditioning system 100 based on a control program for update (hereinafter, appropriately referred to as an "update program") that is input from the outside. The control unit 10 includes an input unit 11, a comparison unit 12, a data generation unit 13, an update setting unit 14, a storage unit 15, a reception unit 16, and a transmission unit 17.

The update program is input to the input unit 11 from the outside. The input unit 11 is, for example, an input interface to which a recording medium that is detachable is connected. When the recording medium is connected, the update program recorded in advance in the recording medium is input to the input unit 11. As the recording medium that is detachable, for example, a universal serial bus (USB) memory or a secure digital (SD) card is used.

The comparison unit 12 compares the input update program with the control program stored in the storage unit 15, and performs various determinations or other operations. For example, when the update program is input, the comparison unit 12 compares a program identification (ID) of the update program with a program ID of the control program stored in the storage unit 15. Then, the comparison unit 12 determines whether or not the input update program is a control program for the equipment 2 disposed in the air-conditioning system 100. Herein, the program ID is identification information unique to the control program.

In addition, the comparison unit 12 compares a version of the input update program with a version of the control program in the storage unit 15 corresponding to the program ID of the update program, and determines which one of the control programs has a newer version than the other. Furthermore, the comparison unit 12 compares an attribute of the input update program with an attribute of the control program in the storage unit 15, and determines whether or not the equipment 2 of the same attribute as the attribute of the update program exists in the system. Herein, the attribute is information indicating a type of the equipment 2 such as an "outdoor unit" or an "indoor unit".

The data generation unit 13 extracts parts where addition and change are made from the control program stored in the storage unit 15 as a differential program based on the update program. Then, the data generation unit 13 generates differential data based on the extracted differential program, address information indicating a written position of this differential program, and version information indicating a version of the update program.

The update setting unit 14 sets the equipment 2 corresponding to the input update program as an update target device of the control program based on an attribute comparison result by the comparison unit 12. In addition, the update setting unit 14 reads out the differential data generated by the data generation unit 13 from the storage unit 15, and supplies the differential data to the transmission unit 17.

The storage unit 15 is configured, for example, by a non-volatile memory, and stores the control program of the equipment 2. The storage unit 15 stores a first control program in each of the one or more pieces of equipment 2 that is received via the reception unit 16. In addition, the storage unit 15 stores the differential data generated by the data generation unit 13.

The reception unit 16 receives the first control program from a control unit 56 in each of the one or more pieces of equipment 2 disposed in the air-conditioning system 100. The reception of the control program from the equipment 2 is performed, for example, in a case where the air-conditioning system 100 is installed for the first time, a case where the equipment 2 is newly added to the air-conditioning system 100, or other cases. When the control program is updated, the transmission unit 17 transmits the differential data to the equipment 2 set as the update target by the update setting unit 14.

The display unit 20 is configured, for example, by a liquid crystal display (LCD) or an organic electro luminescence (EL) display, and displays information related to the update of the control program. It is noted that as the display unit 20, for example, a touch panel display obtained by laminating a touch panel having a touch sensor on the LCD or the organic EL display can be used. In this case, operation buttons and other buttons serving as the operation unit 30 are displayed in the display unit 20.

Various buttons, keys, or other parts operated at the time of the update of the control program are disposed in the operation unit 30, and the operation unit 30 outputs operation signals according to operations on the respective buttons, keys, or other parts. In addition, as described above, when the display unit 20 is the touch panel display, various buttons or keys may also be displayed in the display unit 20 as software buttons or software keys.

The power supply unit 40 controls supply of power to a power source unit 55 of the equipment 2 of the update target. For example, when the control program is updated, in a case where hardware reset of the equipment 2 of the update target is needed, the power supply unit 40 controls on and off of the power source for the equipment 2.

FIG. 3 is a hardware configuration diagram illustrating an example of a configuration of the control unit 10 of FIG. 2. When various functions of the control unit 10 are executed by hardware, as illustrated in FIG. 3, the control unit 10 of FIG. 2 is configured by a communication device 51 and a processing circuit 52. The reception unit 16 and the transmission unit 17 of FIG. 2 correspond to the communication device 51 of FIG. 3. In addition, the respective functions of the input unit 11, the comparison unit 12, the data generation unit 13, the update setting unit 14, and the storage unit 15 are realized by the processing circuit 52.

When the respective functions are executed by hardware, the processing circuit 52 corresponds, for example, to a single circuit, a combined circuit, a programmed processor, a parallel programmed processor, an application specific integrated circuit (ASIC), a field-programmable gate array (FPGA), or a combination of these. The functions of the respective units of the input unit 11, the comparison unit 12, the data generation unit 13, the update setting unit 14, and the storage unit 15 may also be respectively realized by the processing circuits 52, and the functions of the respective units may also be realized by the single processing circuit 52.

FIG. 4 is a hardware configuration diagram illustrating another example of the configuration of the control unit 10 of FIG. 2. When the various functions of the control unit 10 are executed by software, as illustrated in FIG. 4, the control unit 10 of FIG. 2 is configured by a communication device 61, a processor 62, and a memory 63. The reception unit 16 and the transmission unit 17 of FIG. 2 correspond to the communication device 61 of FIG. 4. In addition, each of the functions of the input unit 11, the comparison unit 12, the data generation unit 13, the update setting unit 14, and the storage unit 15 is realized by the processor 62 and the memory 63.

When the respective functions are executed by software, the functions of the input unit 11, the comparison unit 12, the data generation unit 13, and the update setting unit 14 are realized by software, firmware, or a combination of software and firmware. The software and the firmware are written as a program and stored in the memory 63. The processor 62 reads out and executes the program stored in the memory 63 to realize the functions of the respective units.

As the memory 63, for example, a non-volatile or volatile semiconductor memory such as a random access memory (RAM), a read only memory (ROM), a flash memory, an erasable and programmable ROM (EPROM), and an electrically erasable and programmable ROM (EEPROM) or other memories are used. In addition, as the memory 63, for example, a recording medium that is detachable such as a magnetic disc, a flexible disc, an optical disc, a compact disc (CD), a mini disc (MD), and a digital versatile disc (DVD) may also be used.

[Control Program]

Next, the control program stored in the storage unit 15 will be described. FIG. 5 is a schematic diagram illustrating an example of a structure of the control program stored in the storage unit 15 of FIG. 2. The control program is associated with each set of the program ID and the attribute, and stored and managed in the storage unit 15. According to Embodiment 1, the control program is divided into a base program and differential data and stored in the storage unit 15.

The base program is a program serving as a base of the control program and corresponds, for example, to the control program of the first version. The differential data is data including the differential program, the address information of the differential program, and the version information of the control program.

The differential program is a program indicating an added or changed content from the control program of an immediately preceding version. The address information is information indicating an address where the added or changed content from the control program of the immediately preceding version is written. The version information is information indicating the version of the control program. The address information and the version information are written in a previously set area in the differential data.

For example, in the example illustrated in FIG. 5, the storage unit 15 stores a control program X in which a program ID is "xx" and an attribute is "outdoor unit", and a control program Y in which a program ID is "yy" and an attribute is "indoor unit".

The control program X is configured by the base program and three pieces of differential data A to C. The differential data A includes a differential program from the control program of the version 1.00 when the version of the control program is updated from 1.00 to 1.01, address information with regard to this differential program, and version information of the relevant control program (Ver. 1.01). The differential data B includes a differential program from the control program of the version 1.01 when the version of the control program is updated from 1.01 to 1.02, address information with regard to this differential program, and version information of the relevant control program (Ver. 1.02). The differential data C includes a differential program from the control program of the version 1.02 when the version of the control program is updated from 1.02 to 1.10, address information with regard to this differential program, and version information of the relevant control program (Ver. 1.10).

The control program Y is configured by the base program and three pieces of differential data D to F. The differential data D includes a differential program from the control program of the version 1.00 when the version of the control program is updated from 1.00 to 1.01, address information with regard to this differential program, and version information of the relevant control program (Ver. 1.01). The differential data E includes a differential program from the control program of the version 1.01 when the version of the control program is updated from 1.01 to 1.02, address information with regard to this differential program, and version information of the relevant control program (Ver. 1.02). The differential data F includes a differential program from the control program of the version 1.02 when the version of the control program is updated from 1.02 to 1.03, address information with regard to this differential program, and version information of the relevant control program (Ver. 1.03).

When a control program of a latest version is input to the controller 1 in a state where the control programs are stored in the storage unit 15 as described above, the differential program from the control program associated with the corresponding program ID is extracted by the data generation unit 13. Then, the differential data is generated based on the extracted differential program, the address information of the differential program, and the version information of the relevant control program. The generated differential data is stored in the storage unit 15 as the control program of the corresponding program ID and the corresponding attribute.

It is noted that according to Embodiment 1, even in the case of the one or more pieces of equipment of the same attribute, the applied program IDs of the control programs may differ from each other. For this reason, the controller 1 can determine the control programs set in the respective pieces of equipment 2 by managing the control programs based on both the program IDs and the attributes.

[Display by Display Unit 20]

Figure 6:
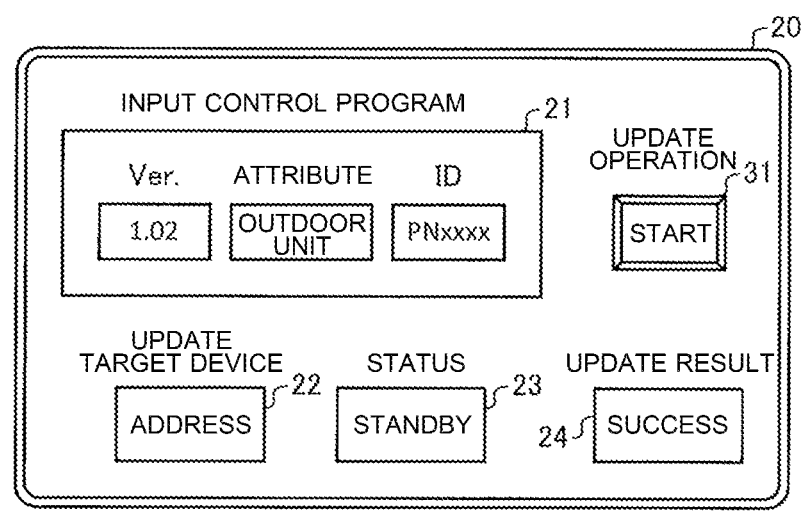
FIG. 6 is a schematic diagram illustrating an example of a display screen by a display unit of FIG. 2.

Next, a display screen by the display unit 20 will be described. FIG. 6 is a schematic diagram illustrating an example of the display screen by the display unit 20 of FIG. 2. It is noted that this example illustrates a case where the display unit 20 is a touch panel display.

As illustrated in FIG. 6, a display screen showing various types of information at the time of the update of the control program is displayed in the display unit 20. An input display area 21, an update target display area 22, a status display area 23, and an update result display area 24 are disposed in the display unit 20.

The input display area 21 is an area where information related to the update program input to the controller 1 from the outside is displayed. In this example, a version of the input update program, an attribute of the update target, and a program ID of the update program are displayed in the input display area 21. When the update program is input from the outside, the above-described various types of information are displayed based on information included in the update program in the input display area 21.

An address of the update target device in which the control program is updated using the input update program is displayed in the update target display area 22. When the update target device is set, the above-described address of the update target device is displayed in the update target display area 22.

Information indicating an update status of the control program for the update target device such as "standby" or "update in progress" is displayed in the status display area 23. In the status display area 23, a message "standby" is displayed until update preparation of the update target device is completed, and a message "update in progress" is displayed when the differential data is generated and the update preparation of the update target device is completed.

Information indicating an update result of the control program for the update target device such as "success" or "failure" is displayed in the update result display area 24. When the controller 1 receives a response with regard to the update of the control program from the update target device, a message "success" or "failure" is displayed in the update result display area 24. For example, when the controller 1 receives a response indicating the completion of the program update from the update target device, the message "success" is displayed in the update result display area 24.

In addition, an update operation button 31 serving as the operation unit 30 for performing the update operation of the control program is displayed in the display unit 20. For example, when the update of the control program for the update target device can be performed, a message "start" is illuminated on the update operation button 31, and an operation of the update operation button 31 can be performed. In this state, when an operator operates the update operation button 31, the update of the control program is started. In addition, a message "end" is displayed on the update operation button 31 during the update of the control program, and the message "end" of the update operation button 31 is illuminated when the update of the control program is ended. It is noted that being "illuminated" on the update operation button 31 represents a state where the button operation can be performed, and being simply "displayed" represents a state where the button operation is not to be performed.

In this manner, according to Embodiment 1, when the display unit 20 is caused to display various types of information, the operator who updates the control program of the equipment 2 can easily check the detailed information of the update program, the information of the update target device, the update status, and other information.

[Program Update Processing]

Program update processing according to Embodiment 1 will be described. Herein, processing by the controller 1 and processing by the update target device will be described.

(Program Update Processing in Controller 1)

Figure 7:
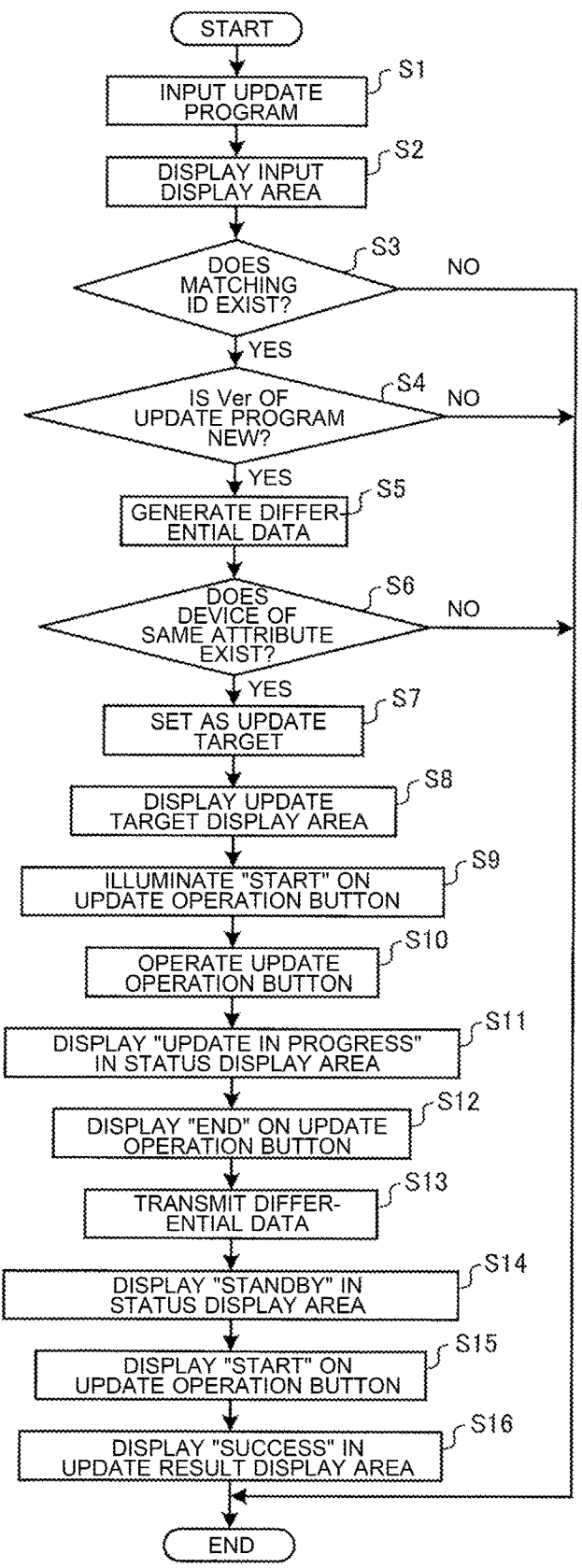
FIG. 7 is a flowchart illustrating an example of a flow of program update processing by the controller of FIG. 2.

The program update processing in the controller 1 will be described. FIG. 7 is a flowchart illustrating an example of a flow of the program update processing by the controller 1 of FIG. 2. First, in step S1, when the update program is input to the input unit 11 of the controller 1, in step S2, the version, the attribute, and the program ID of the update program are displayed in the input display area 21 of the display unit 20.

In step S3, the comparison unit 12 compares the program ID of the input update program with the program ID of the control program stored in the storage unit 15. Then, the comparison unit 12 determines whether or not the control program corresponding to the program ID of the input update program exists in the storage unit 15. This is because the determination is to be made on whether or not the input update program corresponds to the air-conditioning system 100.

When the program ID of the update program exists in the storage unit 15 (step S3; Yes), the processing shifts to step S4. In addition, when the program ID of the update program does not exist in the storage unit 15 (step S3; No), the series of processes is ended.

In step S4, the comparison unit 12 compares the version of the input update program with the version of the control program in the storage unit 15 corresponding to the program ID of the update program. Specifically, the comparison unit 12 compares the version information of the update program stored in a previously set area with the version information included in the latest differential data in the control program of the same program ID in the storage unit 15. Then, the comparison unit 12 determines whether or not the version of the update program is newer than the version of the control program in the storage unit 15.

When the version of the update program is newer than the version of the control program in the storage unit 15 (step S4; Yes), the processing shifts to step S5. In step S5, the data generation unit 13 generates the differential data based on the input update program and the control program stored in the storage unit 15, and stores the differential data in the storage unit 15. On the other hand, in step S4, when the version of the update program is the same as or older than the version of the control program in the storage unit 15 (step S4; No), the series of processes is ended.

In step S6, the comparison unit 12 compares the attribute of the input update program with the attribute of the control program in the storage unit 15. Then, the comparison unit 12 checks whether or not the equipment 2 of the same attribute as the attribute of the update program exists in the system.

When the equipment 2 of the same attribute exists (step S6; Yes), the comparison unit 12 determines that the equipment 2 where the update is needed exists in the air-conditioning system 100. Then, in step S7, the equipment 2 the existence of which is confirmed is set as the update target device of the control program by the update setting unit 14. On the other hand, in step S6, when the equipment 2 of the same attribute does not exist (step S6; No), the comparison unit 12 determines that the equipment 2 where the update is needed does not exist. Then, the series of processes is ended.

In step S8, an address of the update target device set in step S7 is displayed in the update target display area 22 of the display unit 20. Then, in step S9, the message "start" is illuminated on the update operation button 31 of the display unit 20. With this configuration, the operation on the update operation button 31 can be performed.

In step S10, when the update operation button 31 is operated, in step S11, the message "update in progress" is displayed in the status display area 23 of the display unit 20. In addition, in step S12, the message "end" is displayed on the update operation button 31. It is noted that since the update operation button 31 in this case is not illuminated, this is a state where the operation is not to be performed.

In step S13, the update setting unit 14 reads out the differential data generated in step S5 from the storage unit 15, and supplies the differential data to the transmission unit 17. The transmission unit 17 transmits the supplied differential data to the update target device set in step S7.

When the transmission of the differential data to the equipment 2 is completed, in step S14, the message "standby" is displayed in the status display area 23. In addition, in step S15, the message "start" is displayed on the update operation button 31. In this case too, since the update operation button 31 is not illuminated, this is a state where the operation is not to be performed. Then, when the response indicating the completion of the program update is received from the equipment 2, in step S16, the message "success" is displayed in the update result display area 24 of the display unit 20.

(Program Update Processing by Update Target Device)

Next, the program update processing in the update target device will be described. When the differential data is received from the controller 1, the update target device issues a response indicating the reception completion to the controller 1, and saves the differential data. Then, the equipment 2 implements normal operation control and stands by until the time reaches an updatable timing at which the control program can be updated.

The updatable timing is a period in which the operation of the equipment 2 is stopped. Specifically, for example, the updatable timing is a period in which the equipment 2 does not receive an operation instruction, and no communication related to the operation is performed. In addition, for example, the updatable timing is a stop scheduled period during a scheduled operation.

When the time reaches the updatable timing, the equipment 2 resets the device, and updates the control program based on the received differential data. At this time, the equipment 2 refers to the address information included in the differential data, and rewrites the data stored in the address of the current control program that is indicated by the address information to the differential program included in the differential data. With this configuration, the control program of the equipment 2 is updated. When the update of the control program is completed, the equipment 2 transmits the response indicating the completion of the program update to the controller 1.

As described above, in the air-conditioning system 100 according to Embodiment 1, the comparison unit 12 of the controller 1 compares the input update program with the control program of the equipment 2 that is stored in the storage unit 15. Then, the data generation unit 13 generates the differential data between the update program and the control program according to the comparison result, and transmits the differential data to the update target device via the transmission unit 17. With this configuration, since it is not necessary to perform the transmission and reception of the entire update program between the controller 1 and the update target device, the communication data amount can be reduced, and also the control program can be easily updated.

In the air-conditioning system 100, when the control program having the same program ID as the program ID of the update program is stored in the storage unit 15, the comparison unit 12 compares the version of the update program with the version of the control program. When the version of the update program is newer than the version of the control program based on the comparison result, the data generation unit 13 generates the differential data. With this configuration, when the input update program corresponds to the air-conditioning system 100 and also the update program is a newer version than the version of the control program of the update target device at the present time, the differential data is generated. For this reason, the control program in the update target device can be updated by appropriately generating the differential data.

In the air-conditioning system 100, the comparison unit 12 compares the attribute included in the update program with the attribute included in the control program stored in the storage unit 15. When the control program having the same attribute as the attribute of the update program is stored in the storage unit 15 as the result of the comparison, the update setting unit 14 sets the equipment 2 of the corresponding attribute as the update target device. With this configuration, since the equipment 2 having the matching program ID and the matching attribute is set as the update target device, the control program can be appropriately updated by easily specifying the update target device.

In the air-conditioning system 100, the storage unit 15 stores and associates the control program with the program ID and the attribute, and stores and associates the differential data generated by the data generation unit 13 with the control program of the corresponding program ID and the corresponding attribute. With this configuration, the control program is managed by each set of the program ID and the attribute, the version management of the control program can be easily performed for each of the one or more pieces of equipment 2.

In the air-conditioning system 100, the differential data includes the differential program representing the difference between the update program and the control program, and the address information indicating the written position of the differential program from the control program. With this configuration, when the control program is updated in the update target device, the program update can be easily performed.

In the air-conditioning system 100, the display unit 20 that displays the information related to the update program, the information indicating the update target device, and the information indicating the update status and the update result of the control program in the update target device is disposed in the controller 1. With this configuration, when the operator performs the program update processing, since the various types of information related to the program update are displayed, the update processing can be easily performed.

In the air-conditioning system 100, when the differential data is received, the update target device updates the control program at the previously set update timing. The update timing at this time is preferably set as the period in which the operation of the update target device is stopped. With this configuration, the control program can be updated without interrupting the operation of the update target device.

Embodiment 1 of the present disclosure has been described above, but the present disclosure is not limited to the above-described Embodiment 1 of the present disclosure, and various modifications and applications can be made in a range without departing from the gist of the present disclosure. According to Embodiment 1, the controller 1 updates the control program of the equipment 2, but the configuration is not limited to this example. For example, any of one or more pieces of equipment 2 is set as a representative device, the representative device is caused to have the update function of the control program based on the controller 1, and the representative device may also execute the update of the control program on the other equipment 2.

REFERENCE SIGNS LIST 1 controller 2 equipment 3 system management controller 4 outdoor unit 5 indoor unit 6 remote control 10 control unit 11 input unit 12 comparison unit 13 data generation unit 14 update setting unit 15 storage unit 16 reception unit 17 transmission unit 20 display unit 21 input display area 22 update target display area 23 status display area 24 update result display area 30 operation unit 31 update operation button 40 power supply unit 51, 61 communication device 52 processing circuit 55 power source unit 56 control unit 62 processor 63 memory 100 air-conditioning system.

The invention claimed is:

1. An air-conditioning system comprising equipment involved in air-conditioning, the equipment including one or more pieces of equipment, and a controller connected to the equipment and configured to update a control program of the equipment, the control program having a program ID and version information, the controller being configured to
compare a program ID included in an update program for updating the control program of the equipment with a program ID included in the control program stored in a storage of the controller,
compare version information indicating a version of the update program with the version information indicating a version of the control program when the control program having a same program ID as the program ID of the update program is stored in the storage of the controller,
generate differential data between the update program and the control program when the version of the update program is newer than the version of the control program,
set an update target device corresponding to an update target of the control program among the one or more pieces of the equipment based on a comparison result, and
transmit the differential data to the update target device.

2. The air-conditioning system of claim 1, wherein
the controller
compares an attribute indicating a type of the update target device that is included in the update program with an attribute included in the control program stored in the storage of the computer, and
sets, when the control program having the same attribute as the attribute of the update program is stored in the storage of the controller, the equipment of the corresponding attribute as the update target device.

3. The air-conditioning system of claim 2 wherein
the controller
stores the control program to be associated with the program ID and the attribute, and
stores the differential data to be associated with the control program of the corresponding program ID and the corresponding attribute.

4. The air-conditioning system of claim 1, wherein the differential data includes
a differential program representing a difference between the update program and the control program, and
information indicating a written position of the differential program from the control program.

5. The air-conditioning system of claim 1, wherein the controller further includes a display unit configured to display
information related to the update program,
information indicating the update target device, and
information indicating an update status and an update result of the control program in the update target device.

6. The air-conditioning system of claim 1, wherein in a case where the differential data is received, the update target device updates the control program at a previously set update timing.

7. The air-conditioning system of claim 6, wherein the update timing is a period in which an operation of the update target device is stopped.

8. A program update method of an air-conditioning system that updates a control program of equipment involved in air-conditioning, the control program having a program ID and version information, the equipment including one or more pieces of equipment, the program update method comprising:
receiving an update program for updating the control program of the equipment from an outside;
comparing a program ID included in the update program with a program ID included in the control program stored in a storage of a controller, and
comparing version information indicating a version of the update program with the version information indicating a version of the control program when the control program having a same program ID as the program ID of the update program is stored in the storage of the controller,
generating differential data when the version of the update program is newer than the version of the control program,
setting an update target device corresponding to an update target of the control program among the one or more pieces of the equipment based on a result of the comparing; and
transmitting the differential data to the update target device that is set.

9. The program update method of claim 8, further comprising:
comparing an attribute indicating a type of the update target device that is included in the update program with an attribute included in the control program stored in the storage of the controller, and
setting, when the control program having the same attribute as the attribute of the update program is stored in the storage of the controller, the equipment of the corresponding attribute as the update target device.

10. The program update method of claim 9, further comprising:
storing the control program to be associated with the program ID and the attribute, and
storing the differential data to be associated with the control program of the corresponding program ID and the corresponding attribute.

11. The program update method of claim 8, wherein the differential data includes
a differential program representing a difference between the update program and the control program, and
information indicating a written position of the differential program from the control program.

12. The program update method of claim 8, further comprising:
displaying information related to the update program,
displaying information indicating the update target device, and
displaying information indicating an update status and an update result of the control program in the update target device.

13. The program update method of claim 8, further comprising:
in a case where the differential data is received, updating the control program at a previously set update timing.

14. The program update method of claim 13, wherein the update timing is a period in which an operation of the update target device is stopped.

* * * * *